Feb. 23, 1960 P. W. ROBINSON ET AL 2,926,073
APPARATUS FOR MAKING CARBON BLACK
Filed June 17, 1957
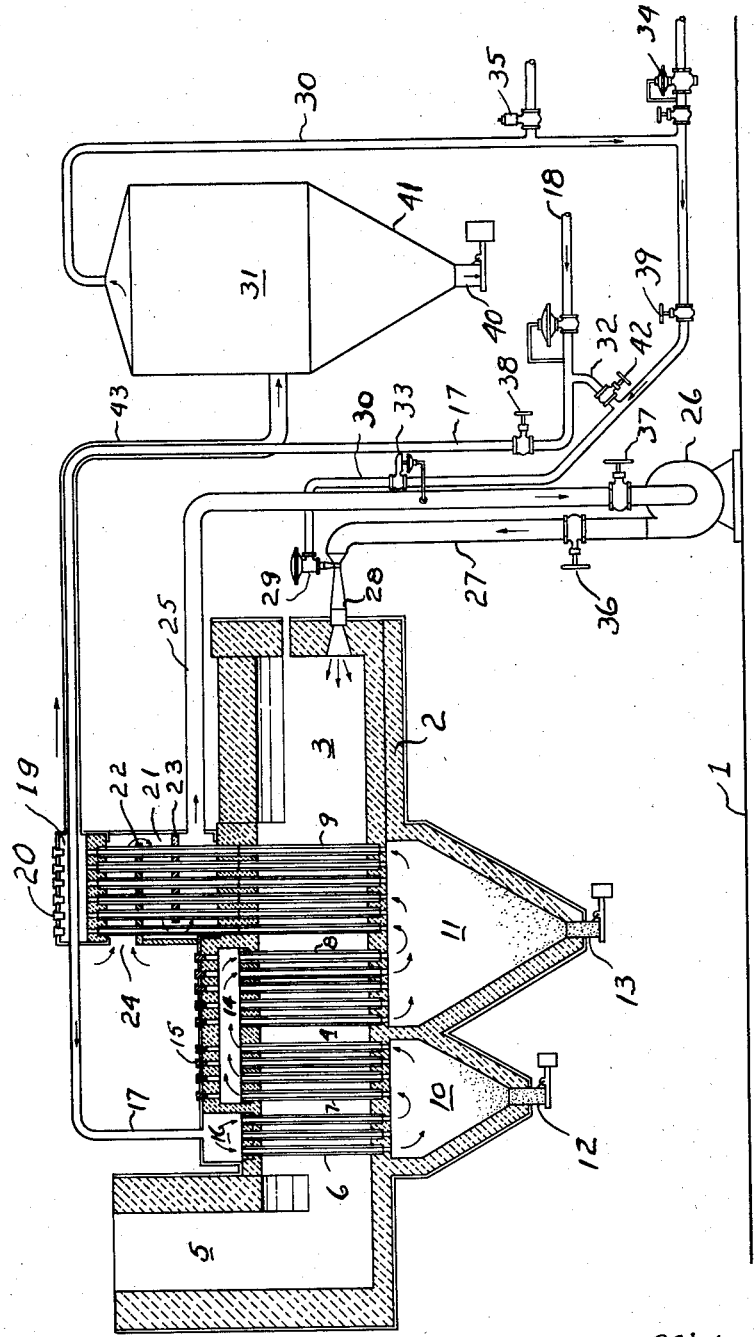
INVENTOR.
Philip W. Robinson
BY Ralph B. Smith Jr.
William B. Jaspert
Attorney

United States Patent Office 2,926,073
Patented Feb. 23, 1960

2,926,073

APPARATUS FOR MAKING CARBON BLACK

Philip W. Robinson and Ralph E. Smith, Jr.,
Downey, Calif.

Application June 17, 1957, Serial No. 665,914

3 Claims. (Cl. 23—259.5)

This invention relates to new and useful improvements in apparatus for and method of making carbon black from any hydrocarbon gas particularly natural gas with hydrogen as a by-product or vice versa, and it is among the objects thereof to provide a method of making carbon black by continuous process as distinguished from the intermittent process heretofore employed.

It is a further object of the invention to provide apparatus for making carbon black in which the natural gas is heated by the hydrogen that has been separated from the carbon during the process.

It is still a further object of the invention to provide apparatus which can be constructed as a self-contained unit, stationary or portable, for use in recovering carbon black from the natural gas of oil wells producing natural gas in amounts not worth piping and pumping.

It is a further object of the invention to provide apparatus for making carbon black from natural gas which shall be air cooled and not require water cooled surfaces for depositing the carbon as in conventional practice.

It is a further object of the invention to provide apparatus for making carbon black from hydrocarbons which shall not allow the products of combustion to come into contact with the dissociating gas.

The invention will become more apparent from a consideration of the accompanying drawing constituting a part hereof in which like reference characters designate like parts and in which the single figure is a vertical section, partially in elevation, taken longitudinally of a furnace for making carbon black embodying the principles of this invention.

In the drawing, the numeral 1 designates the floor of a portable vehicle or a stationary base as the case may be, on which is mounted a furnace generally designated by the numeral 2 suitably supported by buck-stays or other framing and supporting means. Furnace 2 is divided into a combustion chamber 3, a heat exchange tube chamber 4 and a waste gas passage or stack 5. The chamber 4 is provided with banks of tubes 6, 7, 8 and 9, the banks of tubes 6 and 7 communicating with carbon black collecting pits 10 and the banks of tubes 8 and 9 communicating with carbon black collecting pit 11 provided with plugs or stoppers 12 and 13, respectively. A header chamber 14 is disposed above the banks of tubes 7 and 8 and is provided with plugs 15, which when removed expose the tubes for cleaning purposes. The banks of tubes 6 are provided with an inlet chamber 16 connected to a conduit 17 that leads to a source of methane gas connected at 18. The banks of tubes 9 are provided with a header chamber 19 having clean-out plugs 20 and an air chamber 21 having baffles 22 and 23 with an air inlet 24 which provides for the pre-heating of air drawn into opening 24 and passing with a wiping action around the bank of tubes 9 thence through a conduit 25 to a blower 26. The blower delivers heated air by conduit 27 to a burner 28, gas being supplied through the valve 29 by a conduit 30 which leads to a filter tank 31. The pipe line 30 is also connected by a branch line 32 to the source of natural gas flowing through the line 17. A safety shut off valve 33 is provided in the gas line, also a back pressure control valve 34, a safety valve 35, a burner or control valve 36 and 37 and other hand valves 38 and 39. A stopper 40 is provided on the filter tank 31 to remove the carbon particles accumulating in the hopper 41.

The operation of the above-described apparatus for making carbon black is briefly as follows:

The blower 26 is energized. It is preferably operated by an engine operating on natural gas available from the source 18. The blower draws air into the inlet 24 around the baffles 22 and 23 and delivers it to the upright conduit 27 and to the burner 28. Hand valve 42 is opened to allow natural gas from the source 18 to pass through the branch 32 into line 30, then through the fuel injector valves 29 to the burner 28 to establish combustion in the chamber 3. The products of combustion pass rearward to the stack 5 through the chamber 4 in wiping contact with the banks of tubes 6, 7, 8 and 9 heating the outer walls of the tubes. Valve 38 is then opened and natural gas from source 18 is passed through conduit 17 and to the header chamber 16 from which it passes to the banks of tubes 6 into the carbon collector pit 10 then upward through the banks of tubes 7 to the header chamber 14, as shown by arrows. From header chamber 14 the gas passes downward through the banks of tubes 8 into collector pit 11 and thence upward through the banks of tubes as shown by arrows. As the natural gas passes through the heated tubes, which are heated to a temperature of about 1800° F., the methane $CH_4$ ethane $C_2H_6$ and other hydrocarbons, break apart into carbon and hydrogen. The carbon precipitates into the collector pits 10 and 11, particularly so because the flow of the gases are diverted and reversed at the bottom of the banks of tubes and the pure carbon black is thus collected in the receiving pits 10 and 11 and the finer particles are deposited in 41.

The hydrogen gas then passes upward through the bank of tubes 9 into the header chamber 19, thence through conduit 43 to the filter tank 31. Because of the reversal of flow in the tank, any carbon particles in the hydrogen gas will precipitate and be collected in the hopper 41. The hydrogen gas is then conducted from the filter tank 31 through conduit 30 and is then caused to flow to the injector valve 29 of the burner 28. Valve 42 may be closed because more than sufficient hydrogen will be available for maintaining the combustion needed to heat the banks of tubes as herein-above explained. The air for supporting combustion entering the opening 24 is preheated by its wiping contact with the banks of tubes 9 to improve the efficiency of combustion and at the same time cool off the hydrogen as it goes into the header chamber 19 and from there to the filter tank 31.

By means of the above-described apparatus and process for making carbon black from natural gas, a substantial amount of the estimated 37 pounds per 1000 feet of gas will be recovered, as against the recovery of about 3 pounds per 1000 feet by present day practice employing the water cooled surface method for depositing carbon.

Because the equipment does not employ any water for cooling, it is usable in areas where there are oil wells and water is scarce and the equipment may be mounted to be transportable, as with the air cooling the entire unit would be self-contained and would require nothing but gas for its operation. It has been determined by a heat balance that there is more than enough heat in the hydrogen by-product to furnish more than twice the heat required. The excess hydrogen may be compressed into containers for use as a fuel and the like.

Although one embodiment of the invention has been herein illustrated and described, it will be evident to those skilled in the art that various modifications may be made in the details of construction without departing from the principles herein set forth.

We claim:

1. Apparatus for making carbon black and for separating hydrogen from hydrocarbon gases consisting of a furnace structure having a combustion chamber at one end and a waste gas outlet at the other with a heating chamber therebetween, banks of tubes passing through said heating chamber the lower ends of which communicate with hoppers for collecting the carbon black and the upper end of said tubes opening into header chambers, one of the header chambers being connected to a source of hydrocarbon gases and another of the header chambers being connected to a filter tank for separating the carbon and hydrogen, a recuperator chamber having an air passage in heat exchange relation with some of said tubes for preheating air, a burner for said combustion chamber, means for conducting the preheated air from said recuperator air passage to said burner, and a fuel line extending from said filter tank to said burner.

2. Apparatus as set forth in claim 1 in which the source of hydrocarbon gases is connected to the header chamber adjacent the waste gas outlet and the filter tank is connected to the header chamber adjacent the combustion chamber.

3. Apparatus as set forth in claim 1 in which the header chamber of the banks of tubes adjacent the combustion zone is provided with a conduit connecting the same to the filter tank and a second smaller conduit is disposed within said first-named conduit for conducting the hydrogen gases to the header chamber of the bank of tubes adjacent the waste gas outlet to preheat the same.

References Cited in the file of this patent

UNITED STATES PATENTS

| | | |
|---|---|---|
| 986,489 | Moorehead | Mar. 14, 1911 |
| 1,276,385 | McCourt et al. | Aug. 20, 1918 |
| 1,454,609 | Winter | May 8, 1923 |
| 1,843,063 | Burke | Jan. 26, 1932 |
| 1,901,370 | Kuhner | Mar. 14, 1933 |
| 2,029,317 | Guyer et al. | Feb. 4, 1936 |